United States Patent
Rief

(10) Patent No.: US 9,225,184 B2
(45) Date of Patent: Dec. 29, 2015

(54) POWER TOOL BATTERY CHARGING APPARATUS INCLUDING A FLUID COLLECTING SECTION FOR DRAINING FLUID ENTERING THROUGH ONE OR MORE AIR VENTS

(75) Inventor: Joachim Rief, Biberach (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/361,048

(22) PCT Filed: Nov. 29, 2011

(86) PCT No.: PCT/EP2011/071323
§ 371 (c)(1),
(2), (4) Date: May 28, 2014

(87) PCT Pub. No.: WO2013/079101
PCT Pub. Date: Jun. 6, 2013

(65) Prior Publication Data
US 2014/0340025 A1    Nov. 20, 2014

(51) Int. Cl.
*H02J 7/00*    (2006.01)
*H02J 7/02*    (2006.01)

(52) U.S. Cl.
CPC ............ *H02J 7/0042* (2013.01); *H02J 7/0029* (2013.01); *H02J 7/0044* (2013.01); *H02J 7/0052* (2013.01); *H02J 7/027* (2013.01)

(58) Field of Classification Search
CPC ..... H02J 7/0044; H02J 7/0042; H02J 7/0029; H02J 7/0052; H02J 7/027
USPC .................. 320/107, 111, 112, 113, 114, 115
See application file for complete search history.

(56) References Cited

U.S. PATENT DOCUMENTS 5,982,140 A    11/1999   Toya et al.
6,455,186 B1 *  9/2002   Moores et al. ................... 429/71

(Continued)

FOREIGN PATENT DOCUMENTS

EP    716495 A2 *  6/1996
EP    1992248 A1   11/2008

(Continued)

OTHER PUBLICATIONS

International Search Report and Written Opinion of PCT/EP2011/071323 mailed May 30, 2012.
Chapter I International Preliminary Examination Report of PCT/EP2011/071323 mailed Jun. 3, 2014.

*Primary Examiner* — Yalkew Fantu
*Assistant Examiner* — Manuel Hernandez
(74) *Attorney, Agent, or Firm* — Nelson Mullins Riley & Scarborough LLP

(57) ABSTRACT

A charging apparatus is provided for charging a rechargeable battery for a power tool. The charging apparatus comprises a housing (1) with a charging space (4) for a battery, air vents (5) in said charging space and a drain hole at the lower end of the charging space for draining fluid therein. A charging circuit unit (8) is mounted inside the housing (1) for charging the battery. A fan (9) is mounted inside the housing (1) for sucking or blowing air through the air vents (5) for cooling the battery and the charging circuit unit (8). An air guide member (11) is mounted inside the housing (1) between the air vents (5) and the fan (9) for guiding air there between. The air guide member (11) is configured with a fluid collecting section (12) which is communicating with the air vents (5) for collecting fluid entering through said air vents (5), and with a section (13) communicating with said fluid collecting section (12) and the fan (9). The fluid collecting section (12) is configured for draining the collected fluid from said section (12) through a draining device (7).

11 Claims, 6 Drawing Sheets

(56) References Cited

U.S. PATENT DOCUMENTS

| | | |
|---|---|---|
| 7,659,696 B2 | 2/2010 | Zeiler et al. |
| 2003/0090234 A1 | 5/2003 | Glasgow et al. |
| 2008/0102355 A1* | 5/2008 | Moores et al. ............. 429/96 |
| 2009/0085514 A1 | 4/2009 | Mizoguchi et al. |
| 2010/0176761 A1 | 7/2010 | Suzuki et al. |
| 2012/0098494 A1* | 4/2012 | Ogura et al. ............. 320/112 |
| 2013/0127403 A1* | 5/2013 | Chen ............................ 320/107 |

FOREIGN PATENT DOCUMENTS

| | | |
|---|---|---|
| GB | 2401484 A | 11/2004 |
| JP | H10304581 A | 11/1998 |
| JP | 2002334724 A | 11/2002 |
| JP | 2004147360 A | 5/2004 |
| JP | 2004236450 A | 8/2004 |
| JP | 2008067521 A | 3/2008 |
| WO | WO 2008029959 A1 * | 3/2008 |

* cited by examiner

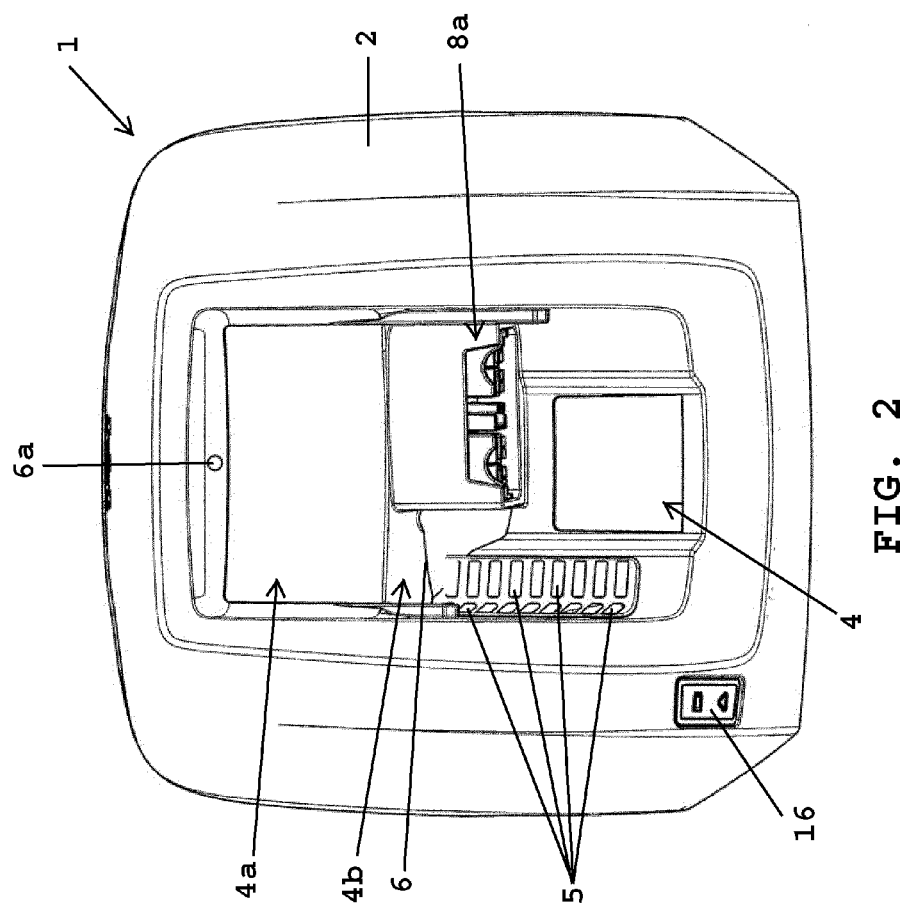

POWER TOOL BATTERY CHARGING APPARATUS INCLUDING A FLUID COLLECTING SECTION FOR DRAINING FLUID ENTERING THROUGH ONE OR MORE AIR VENTS

TECHNICAL FIELD

The present invention relates to a charging apparatus for charging a rechargeable battery for a power tool. The charging apparatus comprises a housing with a sloping charging space for receiving a battery under charging. The housing also has one or more air vents in said charging space for ventilation. The one or more air vents communicate with the interior of the housing. A drain hole is provided in the housing at the lower end of the charging space for draining fluid entering said charging space. A charging circuit unit is mounted inside the housing and electrically connectable to a power source and to the battery under charging in the charging space. Finally, a fan is mounted inside the housing for sucking or blowing currents of air through the one or more air vents for cooling the battery under charging in the charging space and the charging circuit unit.

BACKGROUND OF THE INVENTION

Battery chargers for outdoor use need some protection against rain and condense water as well as melting snow, i.e. they need to be provided with features which prevent water from penetrating through the air vents into the electrical components of the charger inside the housing. Battery chargers for indoor use also need protection, because batteries used outdoor can contain rain water and condense water and/or snow on the outside as well as on the inside. Water from the battery placed on top of the battery charger can then drop through the air vents in the charging space down onto the electrical components inside the housing of the charger. A problem with water may also arise if the fan sucks water through the air vents into the charger.

The usual solution is thereby to locate the air vents in an area separated from the electrical components of the charger and yet close to the electrical components in order to provide satisfactory cooling of the battery under charging and of said electrical components. This compromise has led to constructions, the operation of which hitherto has not been the best.

SUMMARY OF THE INVENTION

Therefore, the primary object of the charging apparatus according to the present invention is to provide a construction which in a satisfactory way unites the above-mentioned two contradictory requirements.

The above object is achieved according to the present invention by providing the initially defined charging apparatus with an air guide member which is mounted inside the housing between the one or more air vents in the charging space and the fan for guiding air therebetween. The air guide member is thereby configured with a fluid collecting section which is communicating with the one or more air vents for collecting in said section fluid entering through said one or more air vents, and with a section communicating with said fluid collecting section and the fan. Finally, the fluid collecting section is configured for draining the collected fluid from said section through a draining device.

One way to realize a charging apparatus as defined above is to configure the fluid collecting section such that it slopes in a direction substantially away from the section communicating therewith and with the fan, and to configure the sloping fluid collecting section, at its lowest end, with a drain hole for connection to a drain pipe which extends through the housing and opens into the bottom side thereof.

Another way to realize a charging apparatus as defined above is to configure the fluid collecting section such that an end portion thereof, limiting the section communicating therewith and with the fan, in its entirety is located at a higher level than at least the lowest portion of the air vent or the lowest air vent in the charging space such that fluid collected in said fluid collecting section will spill over through this air vent to the drain hole in the charging space before the fluid can reach the fan.

In the above-mentioned second embodiment of the charging apparatus of the present invention, it is also possible to configure the fluid collecting section such that it slopes in a direction substantially away from the section communicating therewith and with the fan, in order to thereby facilitate draining of fluid from the fluid collecting section.

BRIEF DESCRIPTION OF THE DRAWINGS

The present invention will be further described below by way of example only and with reference to the accompanying drawings, in which

FIG. 2 is a schematic plan view from above of the charging apparatus according to the present invention.

DETAILED DESCRIPTION OF PREFERRED EMBODIMENTS

Figure 1:
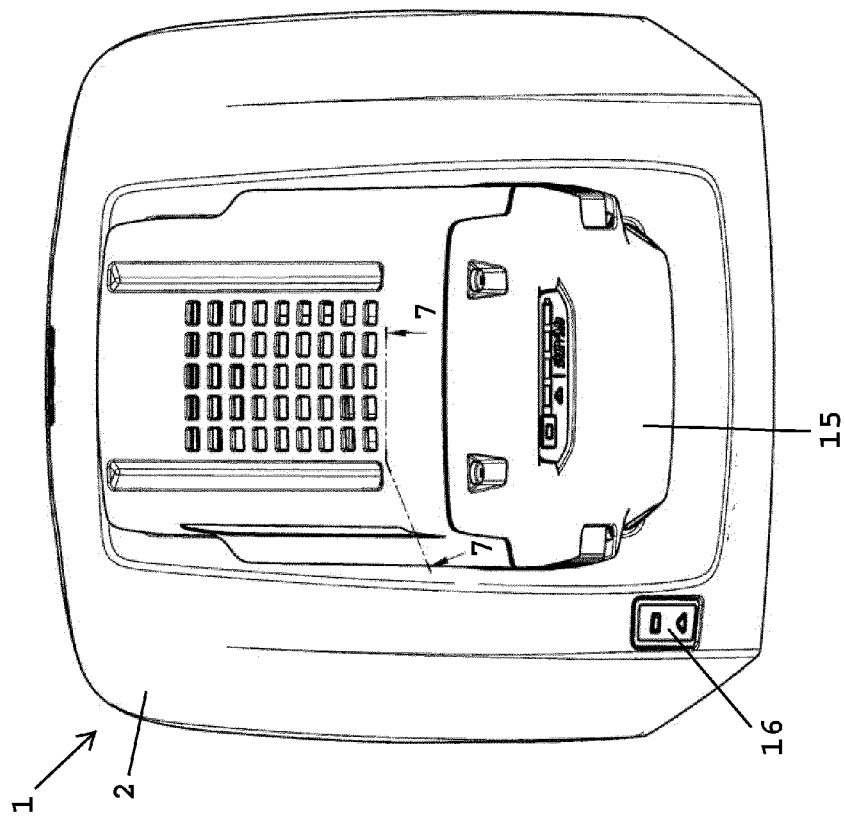
FIG. 1 is a schematic plan view from above of a charging apparatus according to the present invention and of a battery under charging in said charging apparatus.

As stated above, the present invention aims, inter alia, to present a charging apparatus which is capable of providing sufficient cooling of the battery under charging and at the same time provide sufficient protection for the electrical components of the charging apparatus against water.

Accordingly, a charging apparatus for charging a rechargeable battery for a power tool comprises, as shown in the accompanying drawings, a housing 1. The housing 1 is formed of a top cover shell 2 and a bottom cover shell 3 which are fixedly fastened together e.g. by means of screws, thereby defining an inside space. The top cover shell 2 has a charging space 4 for receiving a battery 15 under charging. In the illustrated embodiment, the charging space 4 is sloping downwards in its longitudinal direction from the insertion side for the battery 15 towards contact means 8*a* (see FIG. 2) in the charging space 4 for contacting the battery under charging electrically. In the illustrated embodiment, the charging space 4 is configured with its longitudinal direction extending in the longitudinal direction of the housing 1 of the charging apparatus. It should be noted however, that the charging space 4 may extend in the cross-direction or in any other direction of the housing 1 of the charging apparatus than the longitudinal direction thereof and that the charging space may be configured such that the battery 15 may be inserted into the charging space in the cross-direction thereof. The top cover shell 2 of the housing 1 also has one or, as in the illustrated embodiment, a plurality of air vents 5 which are provided in the charging space 4 one after the other in the longitudinal as well as in the cross-direction/vertical direction thereof for ventilation and which communicate with the inside space of the housing 1. Said plurality of air vents 5 may have the same shape or be shaped differently, i.e. their longitudinal and/or lateral and/or vertical extension in the charging space 4 may vary as desired for optimum function and in accordance with the overall shape and size of the charging space. A drain hole 6 is also provided in the top cover shell 2 of the housing 1. The drain hole 6 is found at the lower end of the charging space 4 for draining fluid entering said charging space. In the illustrated embodiment of the charging apparatus, this drain hole 6 is connected to a draining device in the form of a drain pipe 7 which extends through the housing 1 and ends or opens into the bottom side of the bottom cover shell 3 of the housing. Thus, the fluid can flow from the charging space 4 and through the housing 1 without getting in contact with any electrical components inside the housing, in the inside space thereof. In the illustrated embodiment, the charging space 4 is in its longitudinal direction completed or followed by an additional space 4a for accommodating a part of a battery 15 under charging in the charging space. This additional space 4a is in the illustrated embodiment also provided with a drain hole 6a (see FIG. 2). No air vents 5 are provided in said additional space 4a. The charging space 4 and said additional space 4a are separated by an inclined portion 4b in which the contact means 8a are provided.

The charging apparatus according to the invention further comprises a charging circuit unit of any suitable prior art type. The charging circuit unit, generally designated with reference numeral 8, is mounted in the inside space of the housing 1. The charging circuit unit 8 is electrically connectable to a power source and, through the above-mentioned contact means 8a, to the battery 15 under charging in the charging space 4. In the illustrated embodiment, a switch 16 on the charging apparatus, in the illustrated embodiment on the top cover shell 2 of the housing 1, is operated manually to provide the charging circuit unit 8 with power and start charging of a battery 15 in the charging space 4. After charging, the switch 16 is operated to interrupt the power supply to the charging circuit unit 8. Alternatively, if the charging apparatus is configured with a stand-by mode, the stand-by mode sees to that charging may start automatically as soon as a battery 15 is placed in the charging space 4 after the switch 16 has been operated to provide the charging circuit unit 8 with power. After charging, the stand-by mode sees to that the switch 16 can remain in the position for providing power to the charging circuit unit 8 and yet interrupt the power supply thereto until the next battery 15 is placed in the charging space 4. Another alternative is to replace the switch 16 with another switch (not shown) which is automatically activated to provide the charging circuit unit 8 with power when a battery 15 is placed in the charging space 4. Accordingly, there is then no need neither for a manually operated switch to power the charging unit nor for a stand-by mode and the charging unit is powered only when a battery is charged. Indicator lamps, e.g. light emitting diodes (LEDs), indicating activity/failure of the charging apparatus can be provided on the housing 1. The indicator lamps can be integrated in the switch 16, be located separately on the housing 1 or, if there is no switch 16, be located e.g. at the same position as said switch.

Finally, the charging apparatus according to the invention also comprises a fan 9. The fan 9 is mounted in the inside space of the housing 1. The fan 9 is configured for sucking or blowing currents of air through the one or more air vents 5 in the charging space 4 of the housing 1 for cooling the battery 15 under charging in said charging space and for cooling the charging circuit unit 8. Cooling air currents sucked into the inside space of the housing 1 through the air vents 5 may in the illustrated embodiment of the charging apparatus, after having passed through the fan 9, leave the inside space of the housing through air vents 10 for ventilation in the bottom cover shell 3. Similarly, cooling air currents blown out through the air vents 5 may in the illustrated embodiment of the charging apparatus, before having passed through the fan 9, be sucked into the inside space of the housing through the air vents 10 in the bottom cover shell 3. In the illustrated embodiment, the fan 9 is located inside the housing laterally offset relative to the air vents 5 in the charging space 4, i.e. not directly under the air vents, to make sure that fluid entering through the air vents 5 from the charging space 4 will not drop down onto the fan. However, in the charging apparatus according to the present invention this is not an absolute requirement, as will be evident from the following. The number, shape and location of the air vents 10 may vary as with the air vents 5, such that optimum ventilation and cooling of the battery 15 under charging as well as the charging circuit unit 8 is achieved.

The fan 9 is also electrically connected to a power source, e.g. through the charging circuit unit 8. Although not illustrated in the drawings, the fan 9 may further be connected to the charging circuit unit 8 such that the fan is activated when a battery 15 is brought in contact with the contact means in the charging space 4.

The charging apparatus can be used for charging rechargeable batteries for portable power tools, e.g. hedge trimmers or chain saws, as well as non-portable power tools, e.g. lawn mowers and snow throwers.

Figure 7:
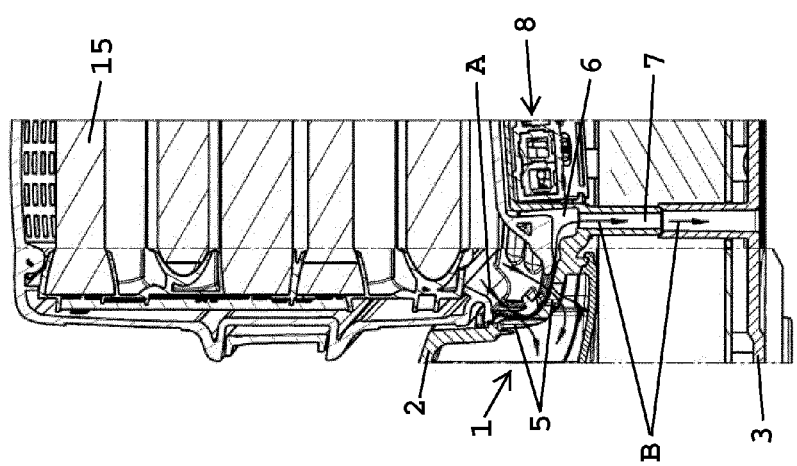
FIG. 7 is a schematic sectional view along the line 7-7 in FIG. 1.
Figure 3:
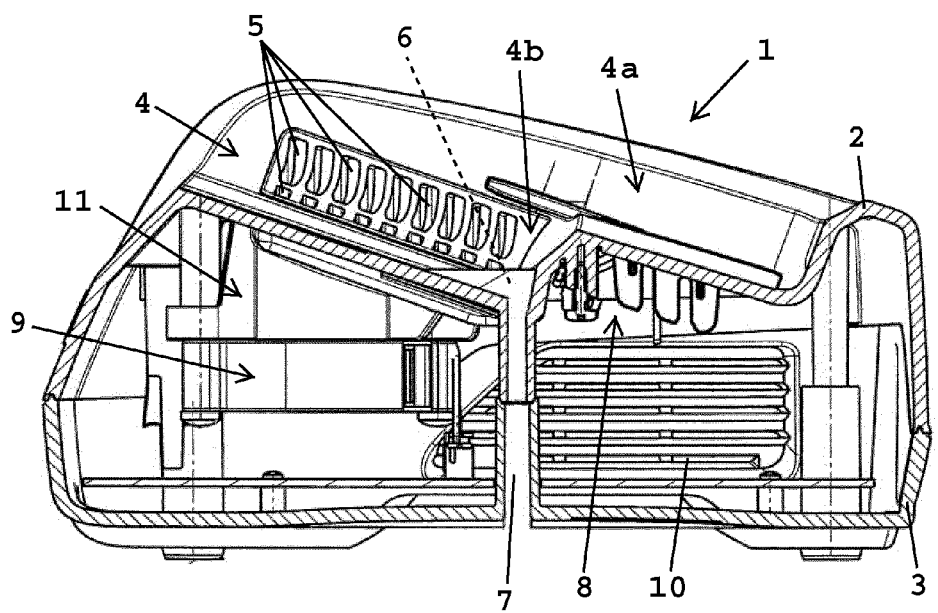
FIG. 3 is a schematic sectional view through the charging apparatus according to the present invention.
Figure 4:
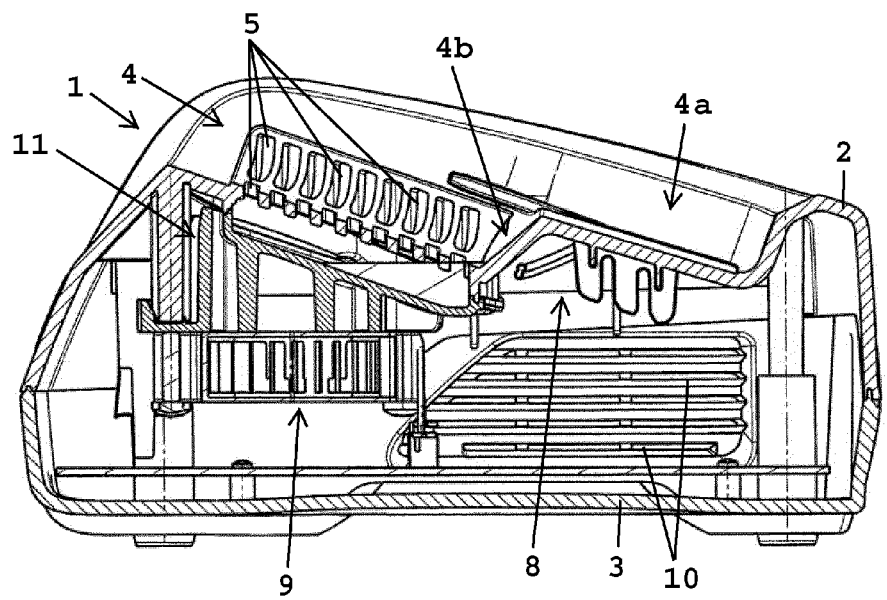
FIG. 4 is another schematic sectional view through the charging apparatus according to the present invention.
Figure 5:
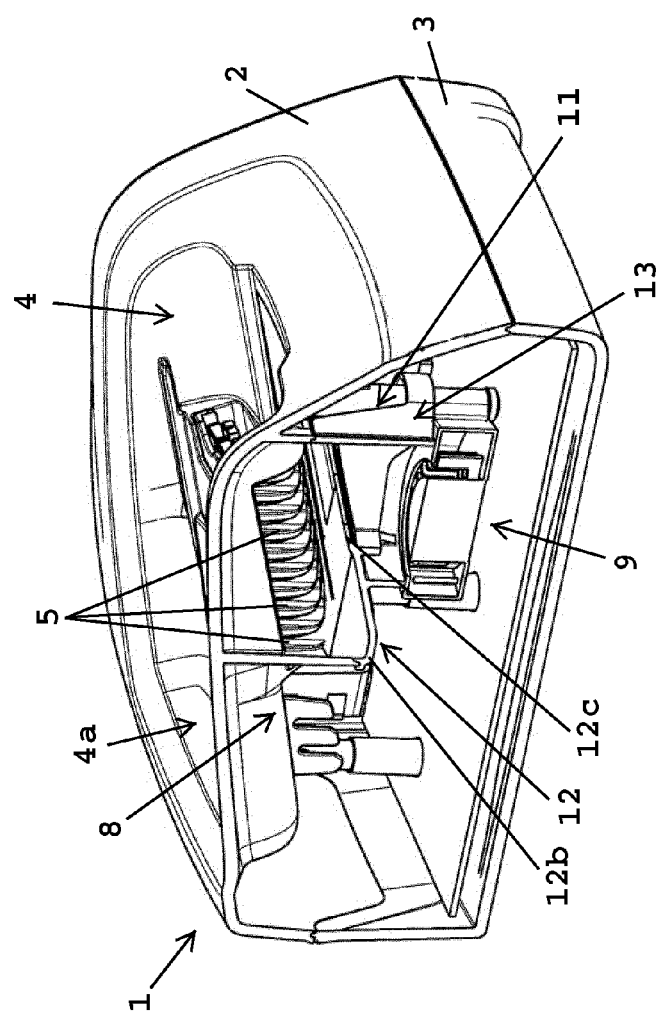
FIG. 5 is a perspective view of the charging apparatus according to the present invention after removal of one side wall of the charging apparatus.

According to the present invention, for optimum ventilation and cooling of the battery 15 under charging and of the charging circuit unit 8, the charging apparatus is further provided with an air guide member 11. The air guide member 11 is mounted in the inside space of the housing 1 between the air vents 5 in the charging space 4 and the fan 9 for guiding air therebetween, i.e. it guides the currents of air from the charging space 4 through the air vents 5 and through the inside space to the fan 9 or it guides the currents of air exiting the fan 9 in the opposite direction to the air vents 5 and out through said air vents into the charging space 4. FIG. 7 illustrates currents A of air flowing through the battery 15 under charging in the charging space 4 and, through the air vents 5, from the charging space into the inside space of the housing 1 and the air guide member 11 therein.

Figure 6:
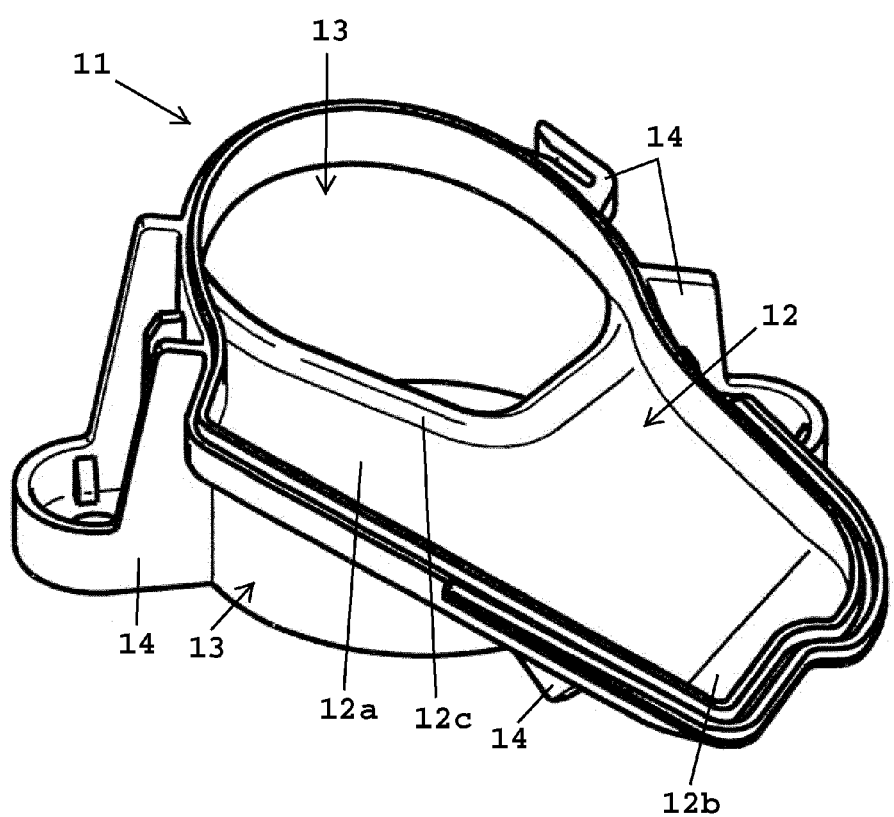
FIG. 6 is a perspective view of an air guide member forming part of the charging apparatus according to the present invention.

The air guide member 11 is in the illustrated embodiment configured with a sloping, substantially trough-like fluid collecting section 12. This fluid collecting section 12 communicates with the air vents 5 in the charging space 4 for guiding currents of air therefrom or thereto and for collecting, in said section, fluid entering the inside space of the housing 1 through the air vents. In order to achieve optimum collection of the fluid from the air vents 5, the fluid collecting section 12 is in the illustrated embodiment configured such that at least a part 12a thereof is located under the air vents 5 in the charging space 4 through which fluid can enter into the inside space of the housing 1. The air guide member 11 is also configured with a section 13 which communicates with the sloping fluid collecting section 12 and with the fan 9 for guiding currents of air therebetween. In order to simplify the construction of the charging apparatus according to the present invention, the section 13 may, as illustrated in the drawings, be located over the fan 9 or at least partly over the fan. Since the fan 9 in the illustrated embodiment is located inside the housing laterally offset relative to the air vents 5 in the charging space 4, as mentioned above, the fluid collecting section 12 and particularly the part 12a thereof located under the air vents is also located laterally offset relative to the section 13 communicating therewith and with the fan. The sloping fluid collecting section 12 is, as illustrated in FIG. 6, configured such that it at least partly surrounds the section 13 communicating therewith and with the fan 9. From FIG. 6 it is also apparent that the section 13 communicating with the fluid collecting section 12 and with the fan 9 has a substantially circular or oval cross-section. This section 13 communicating with the fluid collecting section 12 and with the fan 9 is in the illustrated embodiment defined by a substantially cylindrical member with one opening in each end. It is obvious however, that the air guide member 11 and its sections 12, 13 may vary in shape and location relative to each other as long as the objects of the air guide member to guide currents of air between the air vents 5 in the charging space 4 and the fan 9 and to collect fluid entering through said air vents 5 and, which will be described below, drain the collected fluid, are achieved.

Furthermore, according to the present invention, the sloping fluid collecting section 12 is as indicated configured for draining the collected fluid from said section through a draining device and the sloping extension of the fluid collecting section facilitates this object. Drainage may be achieved e.g. by configuring the fluid collecting section 12 with a drain hole at its lowest end 12b. This drain hole is then connected to a draining device of a suitable configuration, e.g. a drain pipe which extends through the housing and opens into the bottom side of the bottom cover shell 3 thereof (such as drain pipe 7). Alternatively, drainage may be achieved by configuring the sloping fluid collecting section 12 such that an edge portion 12c thereof which limits the section 13 communicating therewith and with the fan 9, or at least a part thereof, in its entirety is located at a higher level than at least the lowest portion of the air vent or, as in the illustrated embodiment, the lowest air vent 5 in the charging space 4. Fluid collected in the fluid collecting section 12 will thereby spill over through this air vent 5 to the drain hole 6 in the charging space 4 before the fluid can reach the fan 9 through the section 13 communicating there-with. FIG. 7 illustrates this spill-over B of fluid from the air guide member 11 and through the lowest air vent 5 to the drain hole 6 in the charging space 4. This is made possible since the fluid collecting section 12 is sloping in a direction away from the section 13 communicating therewith and with the fan 9 and since the edge portion 12c of said first section 12 in the illustrated embodiment is configured such that the opening into said latter section 13 is positioned at a higher level than said first section 12. This latter embodiment is illustrated in the drawings, particularly FIG. 6. As an alternative, the opening into the section 13 communicating with the fluid collecting section 12 and with the fan 9 may be located on the same (sloping) level as the fluid collecting section or even at a lower level as long as the edge portion 12c of said latter section 12 defines a barrier preventing fluid in the fluid collecting section from spilling over into said former section 13. From the drain hole 6 in the charging space 4, fluid will flow into the drain pipe 7 defining the draining device. The drain hole 6 and the drain pipe 7 connected thereto should be configured and/or located such that the fan 9 will suck/blow currents of air substantially from/through the charging space 4 containing the battery 15 under charging and not from/ through the drain pipe. This object is achieved e.g. by locating the drain hole 6 as far as possible from the section 13 communicating with the fluid collecting section 12 and with the fan 9 and e.g. by configuring the drain hole 6 with a relatively small cross-sectional area in comparison with the cross-sectional area of the air vent or in comparison with the total cross-sectional area of all air vents 5. Currents of air flowing through the drain hole 6 and the drain pipe 7 and obstructing the flow of water therein, are thereby substantially obviated.

The drawings also illustrate that, as stated above, the section 13 communicating with the fluid collecting section 12 and with the fan 9 communicates therewith through a cylindrical member. This section 13 may alternatively, based on the construction of the charging apparatus, be made up of e.g. a perforated plate, having one or more openings. The fluid collecting section 12 and/or the section 13 communicating therewith and with the fan 9, may be configured with suitable means 14 for mounting and/or correct location of the air guide member 11 in the inside space of the housing 1. A sealing (not illustrated in the drawings) may be provided around the lower end portion 12b of the air guide member to prevent water collected at this end portion from escaping in any other direction than through the lowest air vent 5 or through the lowest portion of the air vent.

It will be evident to a skilled person that the charging apparatus according to the present invention can be modified and altered within the scope of the subsequent claims without departing from the idea and purpose of the invention. Thus, as indicated above, the shape and size of the air guide member may vary e.g. in accordance with the type of battery to be charged and based on the shape and size of the charging apparatus as well as based on the location, size and shape of the air vents in the charging space. The fluid collecting section of the air guide member may e.g. alternatively, instead of sloping in a direction substantially away from the section communicating therewith and with the fan, have a more horizontal extension. The edge portion thereof, limiting the section communicating with the fluid collecting section and with the fan and defining the barrier against said section for preventing fluid in the fluid collecting section from spilling over into said section communicating therewith, will thereby have a larger height or define the uppermost part of e.g. a wall portion of the fluid collecting section. The relative location of the fluid collecting section and of the section communicating therewith and with the fan may vary. The relative size of the fluid collecting section and of the section communicating therewith and with the fan may also vary and so may their shape.

The invention claimed is:

1. Charging apparatus for charging a rechargeable battery for a power tool, said charging apparatus comprising
    a housing having a sloping charging space for receiving the rechargeable battery under charging, one or more air vents along said charging space for ventilation, said one or more air vents in fluid communication with an interior of the housing, and a drain hole at the lower end of the charging space for draining fluid entering said charging space through a draining device,
    a charging circuit unit mounted inside the housing and electrically connectable to a power source and to the rechargeable battery under charging in the charging space,
    a fan mounted inside the housing for sucking or blowing currents of air through the one or more air vents for cooling the rechargeable battery under charging in the charging space and the charging circuit unit, and an air guide member mounted inside the housing between the one or more air vents in the charging space and the fan for guiding air there between, said air guide member being configured with a fluid collecting section in fluid communication with the one or more air vents for collecting, in said fluid collection section, fluid entering through said one or more air vents, and with a section connected to said fluid collecting section and in fluid communication with the fan, said fluid collecting section being configured for draining the fluid collected from said section through the draining device.

2. The charging apparatus according to claim 1, wherein the fluid collecting section is configured such that it slopes in a direction substantially away from the section in fluid communication with the fan, and wherein the sloping fluid collecting section is at its lowest end configured with a second drain hole for connection to the draining device comprising a drain pipe which extends through the housing and opens at a bottom side of the housing.

3. The charging apparatus according to claim 1, wherein the fluid collecting section comprises an edge portion limiting at least a part of the section in fluid communication with the fan, wherein the edge portion is located at a higher level than at least a lowest portion of the air vent or a lowest air vent in the charging space such that fluid collected in said fluid collecting section will spill over through the lowest air vent to the drain hole in the charging space before the fluid can reach the fan.

4. The charging apparatus according to claim 3, wherein the edge portion of the fluid collecting section is configured to define a barrier between the fluid collecting section and the section in fluid communication with the fan, preventing fluid in the fluid collecting section from spilling over into said section in fluid communication with the fan.

5. The charging apparatus according to claim 1, wherein the fluid collecting section is configured such that at least a part of the fluid collecting section is located under said one or more air vents in the charging space.

6. The charging apparatus according to claim 5, wherein the section in fluid communication with the fan is located laterally offset relative to a part of said fluid collecting section located under the one or more air vents.

7. The charging apparatus according to claim 1, wherein the fluid collecting section is configured such that it at least partly surrounds the section in fluid communication with the fan.

8. The charging apparatus according to claim 1, wherein the fluid collecting section is configured such that the fluid collecting section slopes in a direction substantially away from the section in fluid communication with the fan.

9. The charging apparatus according to claim 1, wherein the section in fluid communication with the fan has a substantially circular or oval cross-section.

10. The charging apparatus according to claim 1, wherein the section in fluid communication with the fan is configured as a cylinder or as a plate with one or more openings.

11. The charging apparatus according to claim 1, wherein the drain hole in the charging space is in fluid communication with the draining device in the form of a drain pipe which extends through the housing and opens at a bottom side of the housing.

* * * * *